US012730558B2

(12) United States Patent
Clark et al.

(10) Patent No.: US 12,730,558 B2
(45) Date of Patent: Sep. 8, 2026

(54) MEMORY EXPANSION WITH PERSISTENT PREDICTIVE PREFETCHING

(71) Applicant: Intel Corporation, Santa Clara, CA (US)

(72) Inventors: Chace A. Clark, Hillsboro, OR (US); Christina Strong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/980,920

(22) Filed: Nov. 4, 2022

(65) Prior Publication Data

US 2023/0052700 A1 Feb. 16, 2023

(51) Int. Cl.
*G06F 3/06* (2006.01)

(52) U.S. Cl.
CPC .......... *G06F 3/0604* (2013.01); *G06F 3/0631* (2013.01); *G06F 3/0679* (2013.01)

(58) Field of Classification Search
CPC .... G06F 3/0604; G06F 3/0631; G06F 3/0679; G06F 12/0882; G06F 2212/1024; G06F 2212/214; G06F 2212/313; G06F 2212/6024; G06F 12/0868; G06F 12/0862
See application file for complete search history.

(56) References Cited

U.S. PATENT DOCUMENTS 8,180,981 B2 5/2012 Kapil et al.
9,948,531 B2 4/2018 Snodgrass et al.
10,007,616 B1 * 6/2018 Feero .................... G06F 9/3802
10,412,197 B1 9/2019 Britto et al.
10,705,973 B2 * 7/2020 Gschwind ........... G06F 12/1009
10,884,930 B2 * 1/2021 Gschwind ................. G06F 8/41
2011/0320747 A1 * 12/2011 Madisetti .............. G06F 12/123 711/E12.001
2012/0059983 A1 * 3/2012 Nellans ............... G06F 12/0215 711/E12.001
2014/0089600 A1 3/2014 Biswas et al.
2014/0281458 A1 * 9/2014 Ravimohan ........... G06F 9/4401 713/2
2017/0228168 A1 8/2017 Bahnsen et al.
2017/0269937 A1 * 9/2017 Eickemeyer ........ G06F 12/0862

FOREIGN PATENT DOCUMENTS

WO WO-9501600 A1 * 1/1995 ......... G06F 12/0866

* cited by examiner

*Primary Examiner* — Kevin Verbrugge
(74) *Attorney, Agent, or Firm* — Compass IP Law PC

(57) ABSTRACT

A memory device with non-volatile memory and persistent predictive prefetching provides highspeed storage to a computer system. The memory device uses a non-volatile memory to store data and a volatile memory to cache the data from the non-volatile memory. The computer system sends access requests to obtain data in the non-volatile memory. A prediction engine in the memory device receives the access requests. The prediction engine compute access histories based on the access requests and stores them in an access history table. The prediction engine computes prediction of non-volatile memory addresses that will be accessed in the future based on the stored access history table. The prediction engine causes to store the data from the predicted addresses of the non-volatile memory in the volatile memory. The memory device stores the prediction in the non-volatile memory so the past predictions can be used after restarting the computer system.

18 Claims, 10 Drawing Sheets

MEMORY EXPANSION WITH PERSISTENT PREDICTIVE PREFETCHING

FIELD

Descriptions are generally related to memory technology, and more particularly, descriptions are related to memory prefetch.

BACKGROUND

A computer system may use a memory device to increase the available storage capacity. The peripheral component interconnect express (PCI Express, or PCIe) bus standard has widespread use in computer systems for the processor to communicate with and access the memory device. The compute express link (CXL) standard can also be used to connect the central processing unit (CPU) to the memory device.

To reduce the latency and deliver the data to the host (e.g., CPU) as quickly as possible, the computer system uses caching, such as a two-level memory (2LM) cache where the data in a region of memory is stored in a dynamic random access memory (DRAM) after a data in that region is requested by the host, with the anticipation that the host will request the cached data in the future. Caching during the subsequent run of a program does not benefit from the information of the cache misses and cache hits during the previous execution of the same program.

Predictive prefetching is used in cache design to reduce the number of cycles the CPU waits for memory operations from the main memory. With predictive prefetching, the data is fetched from slower memory to a faster memory before it is needed. Predictive prefetching is often incorporated on the CPU die. As a result, a very limited amount of memory can be used for storing and making predictions, which limits the effectiveness of prefetching for improving the caching latency. Moreover, predictive prefetching does not leverage heuristic or learned information in a way that can be used when an operating system (OS) changes the placement of pages from run to run or between power cycles.

A memory device may include multiple units that can be independently accessed. When the host reads from or writes to a memory unit, dissipated electric energy causes the unit's temperature to rise. Warmer memory units often have more significant access latency. The OS tracks the page heat in memory units and manages access based on their temperature. Since caching is performed in volatile memory, there is no persistence of the caching information.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention and do not necessarily all refer to the same implementation. However, they are also not necessarily mutually exclusive.

Figure 1:
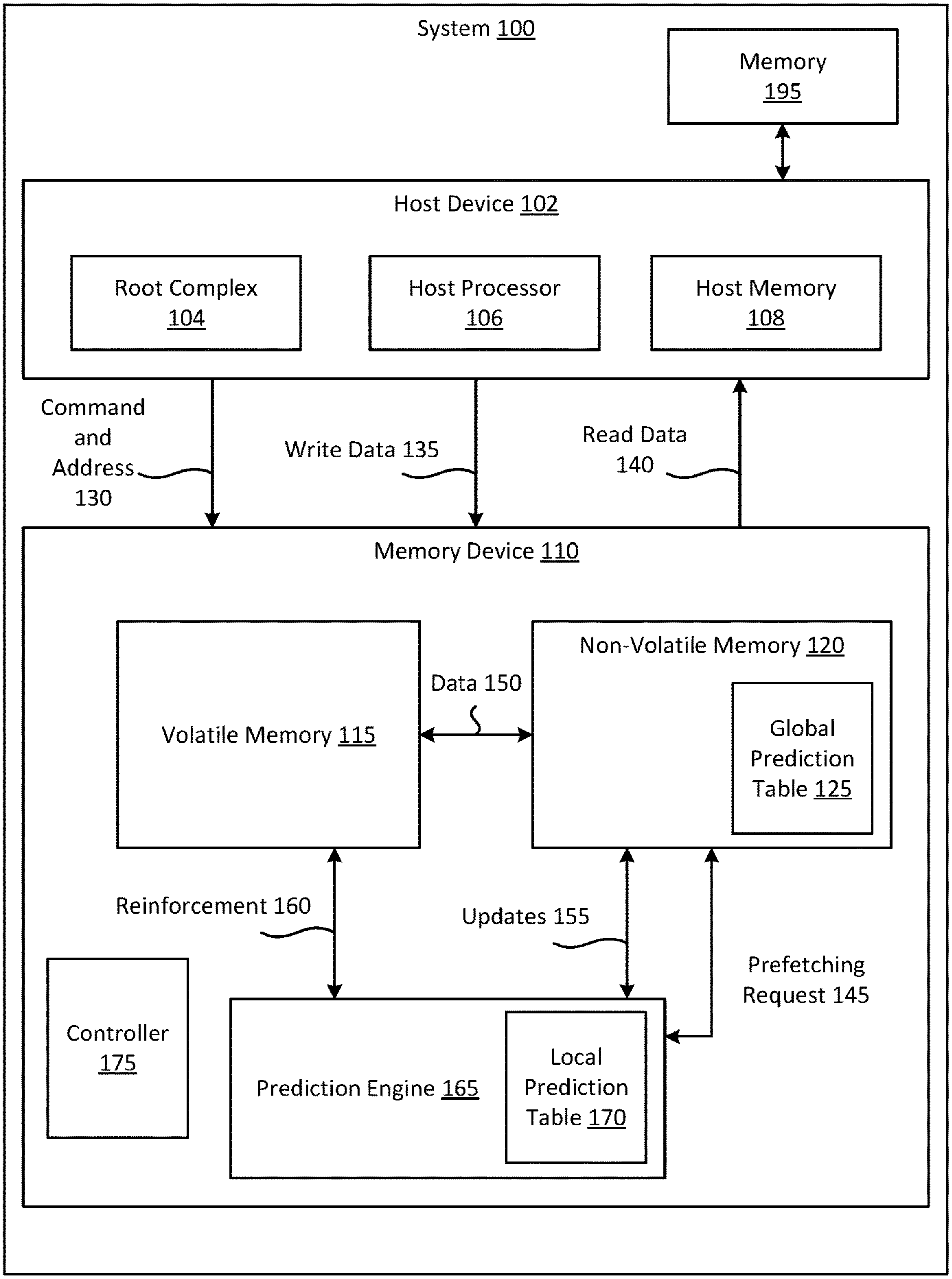
FIG. 1 is a block diagram of an example of a system including a memory device with persistent predictive prefetching.

Descriptions of certain details and implementations follow, including non-limiting descriptions of the figures, which may depict some or all examples, as well as other potential implementations.

DETAILED DESCRIPTION

As described herein, a memory device with persistent predictive prefetching and non-volatile memory provides memory expansion to a host computer system. The memory device also includes a volatile memory for caching and prefetching the data stored in the non-volatile memory. In one example, the only memory space exposed and available to the host is the non-volatile memory, and the volatile memory is not addressable by the host. A prediction engine uses reinforcement learning and the persistence of non-volatile memory to increase the efficacy of the volatile memory cache. The prediction engine uses information, including but not limited to present and past processes, memory access pattern signatures of different processes, and the host operating system available and allocated resources, to predict and prefetch data from the non-volatile memory into the volatile cache. By storing memory access pattern signatures in the non-volatile memory, a prediction engine can maintain its state and reuse the past learning even after a power cycle or the computer system reboot. Therefore, persistent predictive prefetching is the prediction made by the prediction engine to prefetch the data from the non-volatile memory into the volatile memory. The prediction is persistent because the memory device stores the predictions and their parameters in the non-volatile memory, and the memory device can repeat the predictions for subsequent execution of a program or after a reboot. In one example, the prediction engine can also use the typical cache policies, such as a set-associative cache, for reinforcement mechanisms to improve the prediction engine's operation over time.

Two techniques can improve the prefetching schemes. First, adding persistence to the caching methods so that prefetching can use information and improvements before a power cycle and restart. Second, making the prefetching independent of the actual memory allocation provided by the OS. For example, the memory pages assigned by the OS to a program can change from run to run and boot to boot, causing the caching methods to be unable to use past learnings during the execution of a program to future runs of the same program.

In one example, the memory device is a CXL.mem device; a compute express link (CXL) component that implements the CXL.mem protocol. Compute express link is a cache-coherent interconnect for a high-speed connection between the central processing unit (CPU) and peripheral devices such as memory expansion devices. In one example, the non-volatile memory is based on 3D XPoint technology, phase-change memory (PCM) technology, or memristor technology. In one example, the volatile memory is a dynamic random access memory (DRAM). In another example, the volatile memory is a static random access memory (SRAM).

In one example, the addresses of the memory pages assigned by the operating system (OS) to a program can change from run to run or from boot to boot. The prediction engine maps the page number of a program to a page index to create memory access patterns and predictions independent of OS assignment. This mapping methodology allows the prediction engine to reuse memory access patterns and predictions for the subsequent execution of a program or after a reboot.

In one example, the memory device can disable prefetching when the device is under load and cannot service all the requests from the host. In one example, the memory device uses the CXL indicator that determines whether the device is under load to disable or enable prefetching.

FIG. 1 is a block diagram of an example of system 100, including memory device 108 with persistent predictive prefetching. System 100 includes host device 102 coupled to memory device 108 via one or more compute express links (CXL). Host device 102 represents a processor or a computing device. Memory device 110 includes non-volatile memory 110 available to host device 102.

Host device 102 includes host processor 106 to execute instructions and perform computations in system 100. In one example, host device 102 includes the basic input/output system (BIOS), which manages the memory configuration of host device 102. Host processor 106 can execute the host operating system (OS) and one or more host applications.

In one example, BIOS can configure the host OS with memory configuration information. Memory configuration enables the host OS to allocate memory resources for different applications or workloads.

In one example, the host OS can execute drivers, which represent device drivers to manage hardware components and peripherals of system 100. In one example, host processor 106 executes applications. In one example, applications are software programs. In another example, applications are processes that manage the operation of system 100. Execution of applications is referred to as workloads executed in host device 102. The execution of the host OS and applications generates memory access requests.

System 100 includes main system memory 195, such as double data rate (DDR) type memory. Memory 195 represents volatile memory resources coupled to host device 102. In one example, memory 195 can be part of host device 102. Host device 102 couples to memory 195 via one or more memory (MEM) channels. The memory controller of host device 102 manages access by the host device to memory 195. In one example, host device 102 includes host memory 108, such as high bandwidth memory (HBM) or on-die memory.

In one example, the memory controller is part of host processor 106 as an integrated memory controller. In one example, memory controller is part of root complex 104, which generally manages memory access for host device 102. In one example, root complex 104 is part of host processor 106, with components integrated onto the processor die or processor system on a chip. Root complex 104 can provide one or more communication interfaces for host processor 106, such as peripheral component interconnect express (PCIe). In one example, root complex 104 is implemented in hardware. In one example, root complex 104 is implemented in software. In one example, root complex 104 has both hardware and software components. Herein, root complex 104 is also referred to as the interconnect or PCIe block.

In one example, host device 102 includes root complex 104 to couple with memory device 108 through one or more links or network connections, for example, a CXL memory transaction link or CXL.mem transaction link.

In one example, the host OS allocates and manages system resources, including host processor 106 processing cycles and memory resources provided by memory 195, host memory 108, and memory device 110. In one example, the host OS initiates and participates in moving memory contents from one region to another. In one example, when the system executes an application, the host OS allocates the required memory for execution. In one example, the host OS initiates and participates in offloading memory contents to another memory or a storage device, e.g., a hard drive or a storage disk. The host OS may allocate different memory resources to a program from run to run or during different executions. It is also possible that the OS performs memory migration during the execution of a program and moves the content of a program from one region of the memory to another.

In one example, memory device 110 includes non-volatile memory 120, volatile memory 115, and prediction engine 165. Non-volatile memory 120 is the addressable memory available to host device 102 for storing and retrieving data. Host device 102 can access non-volatile memory 120 via command and address 130. In one example, command and address 130 includes commands such as read command for reading data from non-volatile memory 120 or write command for writing data in non-volatile memory 120. In one example, command and address 130 includes the address of one or more memory locations in non-volatile memory 120 where a read command or a write command is targeting. In one example, when host device 102 sends a write command via command and address 130, it also sends write data 135 signal that includes the data that memory device 110 would store in the non-volatile memory address identified by command and address 130. In one example, when host device 102 sends a read command via command and address 130, read data 140 signal includes the data that memory device 110 returns to host device 102.

Memory device 110 includes volatile memory 115. Volatile memory 115 is communicatively coupled with non-volatile memory 120. In one example, volatile memory 115 is a cache memory that caches the data from non-volatile memory 120. When host device 102 requests data from non-volatile memory 120, memory device 110 first checks whether the requested data is cached in volatile memory 115. If the data is available in volatile memory 115, memory device 110 returns the requested data via read data 140 signal to host device 102. If the data is unavailable in volatile memory 115, command and address 130 identifies the address of non-volatile memory 120 from which the data is retrieved and returned to host device 102.

In one example, volatile memory 115 is not addressable by host device 102. Host device 102 and the host OS do not have direct access to or control of the content of volatile memory 115. In another example, volatile memory 115 is addressable by host device 102.

In one example, memory device 110 includes controller 175. Controller 175 controls and regulates the data traffic and transactions between memory device 110 and host device 102. Controller 175 receives command and address 130 signal, manages and coordinates access to volatile memory 115 and non-volatile memory 120, and controls the execution of writing into and reading from volatile memory 115 and non-volatile memory 120.

Memory device 110 includes prediction engine 165. In one example, prediction engine 165 is made of hardware components and circuitry. In one example, prediction engine 165 is made of software. In one example, prediction engine 165 includes both hardware and software. Prediction engine 165 tracks the access requests to non-volatile memory 120 made by host device 102. Using the past access requests, prediction engine 165 predicts future non-volatile memory 120 addresses that host device 102 may read in the future. Memory device 110 stores the data in the predicted addresses of non-volatile memory 120 in volatile memory 115. In one example, prediction engine 165 sends a prefetching request 145 to non-volatile memory 120. Prefetching request 145 includes the address of a memory cell, pages of memory, or a memory region of non-volatile memory 120. The prefetching request 145 causes the memory device 110 and controller 175 to transfer data 150, stored in the predicted region of non-volatile memory 120, to volatile memory 115.

In one example, a region of non-volatile memory 120, referred to as global prediction table 125, is reserved for storing predictions made by prediction engine 165. In one example, prediction engine 165 includes a memory for storing predictions, referred to as local prediction table 170. In one example, prediction engine 165 uses the locally stored information to make predictions and stores predictions in the local prediction table 170. Prediction engine 165 updates global prediction table 125 by sending update 155 signals. Update 155 signal updates the global prediction table 125 based on the information stored in local prediction table 170.

In one example, prediction engine 165 uses reinforcement learning to improve the prediction. Prediction engine 165 tracks the quality of its predictions based on whether the predicted data was requested by host device 102. Reinforcement 160 signal carries the information about predictions, and prediction engine 165 uses reinforcement 160 to adjust and improve its predictions. In one example, prediction engine 165 is communicatively coupled with volatile memory 115 and non-volatile memory 120.

In one example, local prediction table 170 and global prediction table 125 have a structure similar to a cache, e.g., set associative structure. Cache structure allows for collision resolution and aging of prediction tables. In one example, global prediction table function as a flat table without collision resolution. In one example, local prediction table is static random access memory (SRAM).

Figure 2A:
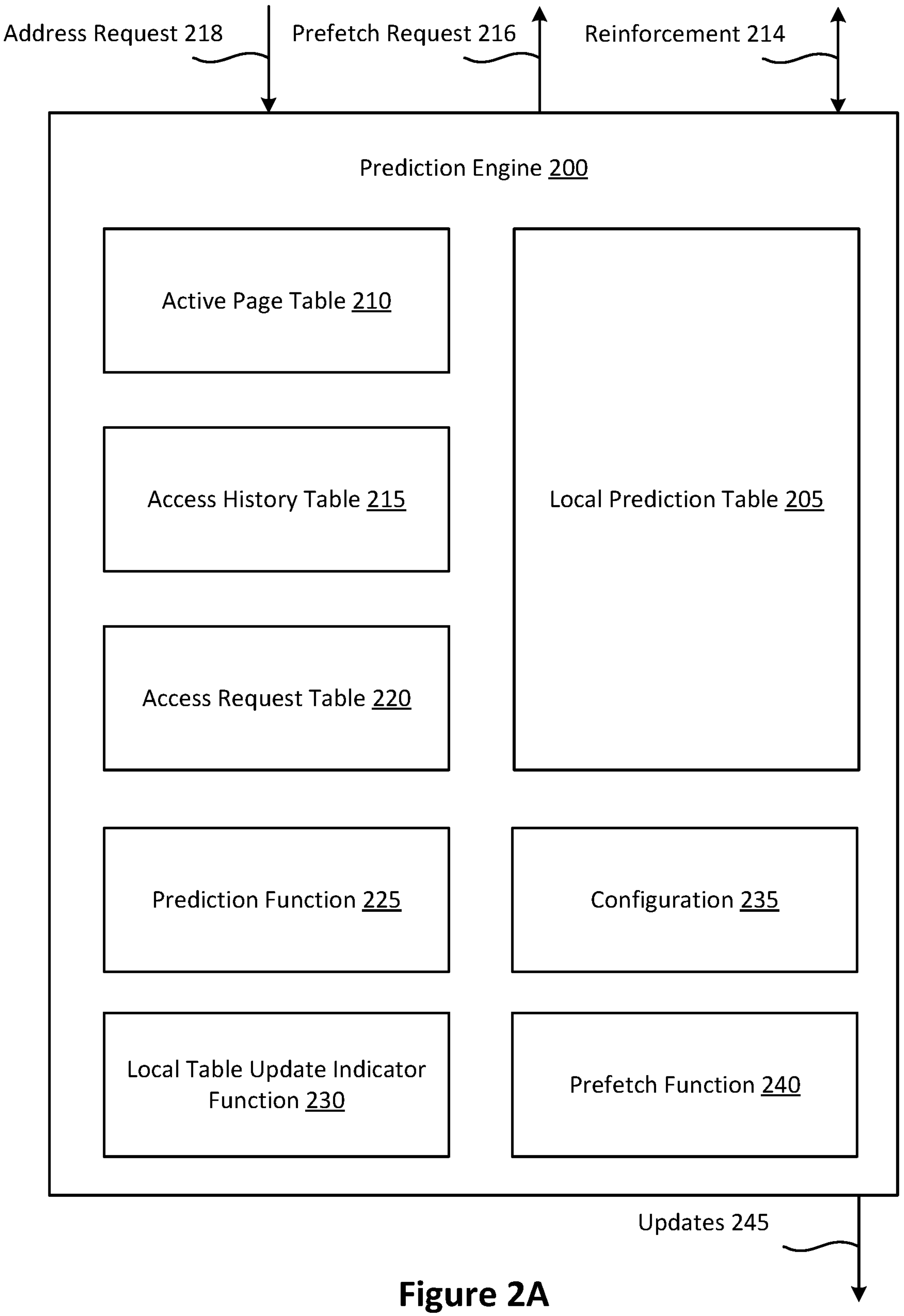
FIG. 2A is a block diagram of an example of a prediction engine.
Figure 2B:
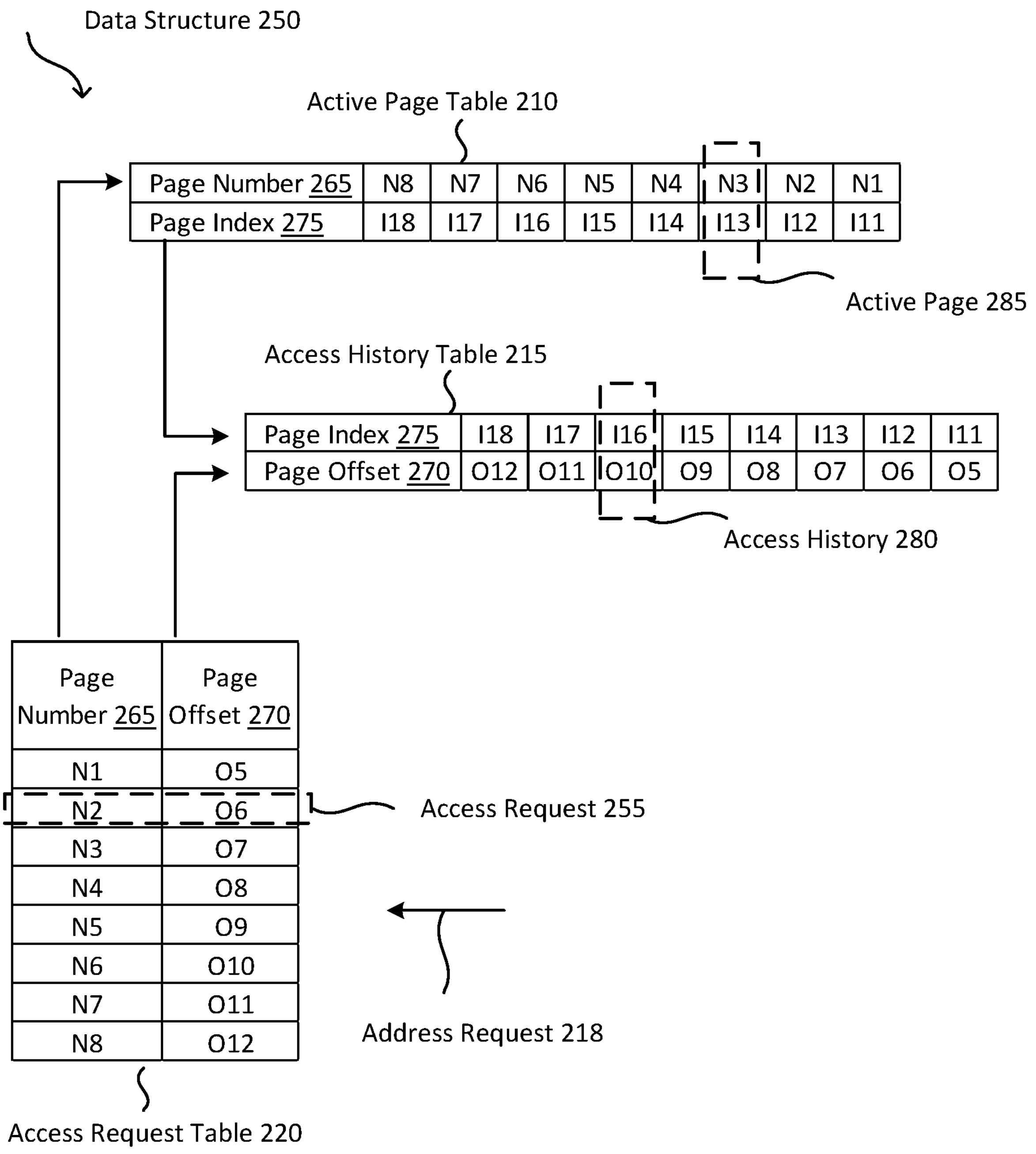
FIG. 2B is an example of the data structure of tables stored in the prediction engine.

FIG. 2A is a block diagram of an example of a prediction engine 200, and FIG. 2B is an example of the data structure 250 of tables stored in the prediction engine. In one example, memory storage capacity is divided into fixed-length contiguous blocks referred to as a page or a memory page. In one example, the memory page includes virtual memory. In another example, the memory page includes physical memory. In one example, a computing device, such as host device 102 in FIG. 1, sends an access request to the memory device. The access request includes an address, address request 218, pointing to a memory location where the data is stored. Prediction engine 200 receives address request 218. Address request 218 includes access request 255. Access request 255 includes page number 265 and page offset 270. Page number 265 indicates the memory page's beginning address, and page offset 270 shows the location of the data inside the memory page. Prediction engine stores the received address request 218 in access request table 220. Access request table 220 stores access requests 255 and includes a column for storing page numbers 265, N1-N8, and a column for storing page offsets 270, O5-O12. Entries in each row of access request table 220 are associated with one another, corresponding to one address request 218. For example, O9 is the page offset of page number N5, and (N5, O9) belongs to the same address request 218.

In one example, prediction engine 200 maps each page number 265 into a page index 275. For example, page number N8 is mapped into page index I18. Prediction engine 200 includes an active page table 210 to store active page 285. Each active page 285 includes page number 265 and its associated page index 275. For example, (N3, I13) is one active page 285 where page number N3 is mapped to page index I13. Active page table 210 includes one column for storing page number 265, N1-N8, and one column for storing page index 275, I11-I18, and each row is an active page 285 entry. In one example, Active page table 210 and access request table 220 are one table with a common page number 265 column. Making prediction based on the page index 275 allows the prediction engine to make predictions independent of the actual memory page allocated to an application and to use the past forecasts or predictions from run to run of an application or after rebooting the computer system.

In one example, prediction engine 165 computes an access history 280 based on access request 255. While access request 255 and address request 218 directly points to a memory storage location, access history 280 points to a memory storage location via a reference. Access history 280 includes a page index 275 and a corresponding page offset 270. For example, access history 280 includes page index I16 and page offset O10. On the one hand, page offset O10 is associated with page number N6 in access request table 220; on the other hand, page number N6 is associated with page index I16 in active page table 210. Prediction engine 200 stores access history 280 in access history table 215. Access history table 215 includes a column for storing page index 275 and another for page offset 270. In one example, prediction engine 200 stores access history 280, active page 285, and access requests in one table.

In one example, prediction engine 200 includes prediction function 225. Prediction function 225 computes a prediction based on the address request 218 and information stored in active page table 210, access history table 215, and access request table 220. In one example, prediction function 225 implements a machine-learning algorithm. In one example, prediction function 225 uses reinforcement learning for making predictions. Prediction engine 200 receives reinforcement 214 signal that carries information associated with a prediction. Prediction engine 200 uses reinforcement 214 to evaluate its predictions and modifies its future predictions. In one example, prediction function 225 uses a hash function for generating an index directed to a prediction stored in the volatile memory.

In one example, prediction engine 200 includes local prediction table 205 to store predictions made by prediction function 225. In one example, prediction engine 200 includes local table update indicator function 230. Update indicator 230 triggers the updating of prediction table in which updates 245 updates the content of the global prediction table, for example, table 125 in FIG. 1 using the content of local prediction table 205.

In one example, prediction engine 200 includes prefetch function 240. In response to a prediction and determination that the data associated with the prediction is not cached, prefetch function 240 triggers the prefetching of the data from the non-volatile memory and storing it in the volatile memory. Prefetch function 240 generates prefetch request 216. In one example, the volatile memory, the non-volatile memory, and the controller in the memory device receive the prefetch request 216.

In one example, prediction engine 200 includes configuration 235. Configuration 235 contains information such as cache eviction policy, number of access history to be used by prediction function 225 for making a prediction, criteria used by local table update indicator function 230 for generating update 245, quality of prediction, and initial value of prediction quality, and number of bits used for quantifying the quality of predictions.

In one example, prediction engine 200 includes memory hardware for storing active page table 210, access history table 215, access request table 220, configuration 235, and local prediction table 205. In one example, one or more of: active page table 210, access history table 215, access request table 220, configuration 235, or local prediction table 205 are stored in the volatile memory.

In one example, prediction engine 200 separates memory accesses based on the core that generates them. For each logical central processing unit (CPU) on the host, prediction engine 200 keeps a separate active page table, access history table, and page index history.

In one example, prediction function 225 correlates the predictions associated with consecutive address requests 218. In one example, when there is a large sequential memory access, prediction engine 200 would collapse the sequential access into a single entry in the active page table 210, access history table 215, and access request table 220.

In one example prediction engine includes a processing core (not depicted in the figures). The processing core performs all the internal computations for the prediction engine, such as computing access request 255, active page 285, and access history 280.

In one example, active page table 210, access history table 215, and access request table 220 are implemented based on a first-in-first-out data structure. The oldest entry is removed from the bottom as a new entry is pushed to the top of the table.

Figure 3A:
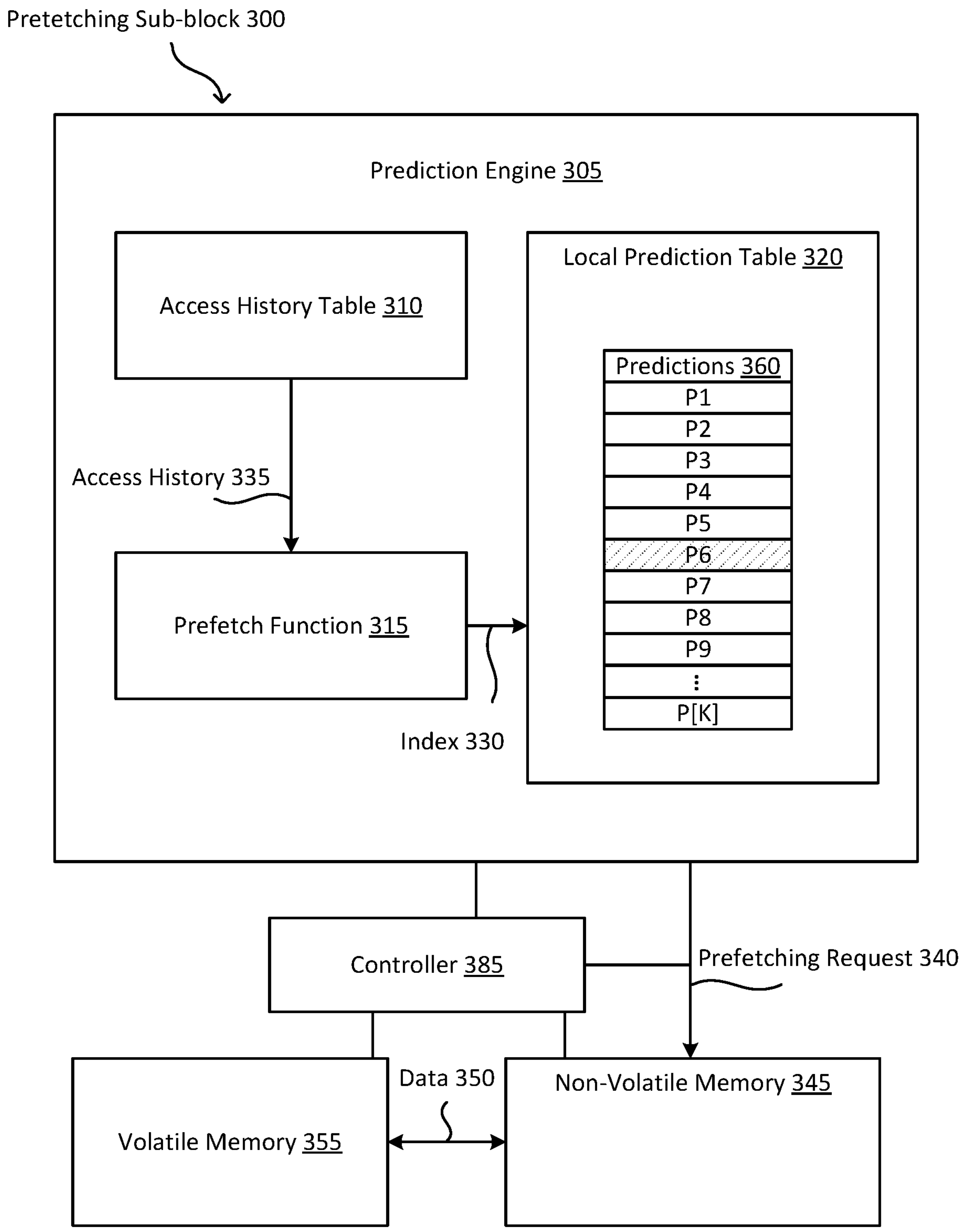
FIG. 3A is a block diagram of an example of a prefetching sub-block.
Figure 3B:
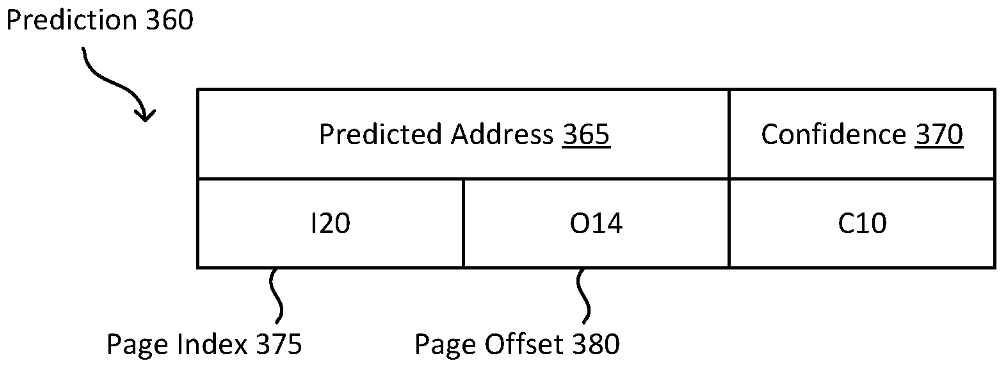
FIG. 3B is an example of the data structure of a prediction.

FIG. 3A is a block diagram of an example of a prefetching sub-block 300, and FIG. 3B is an example of the data structure of a prediction 360. When the memory device receives a new access request, prediction engine 305 computes a new access history 335 and stores it in the access history table 310. Prefetch function 315 receives access history 335 from access history table 310. Prefetch function 315 generates an index 330 that points to an entry, i.e., a prediction 360, in local prediction table 320. In one example, prediction engine 305 first checks whether the data in non-volatile memory indicated by predicted address 365 is cached in volatile memory. If the data is not cached, prediction engine 305 generates prefetching request 340. In another example, prediction engine 305 generates prefetching request 340 based on prediction 360, and controller 385 checks whether the associated data needs to be cached. If the data needs to be cached, controller 385 coordinates and enables the transfer of data 350 from non-volatile memory 345 to volatile memory 355. Data 350 includes the data stored in the non-volatile memory address indicated by predicted address 365 of prediction 360. For example, In FIG. 3A, local prediction table 320 stores K predictions P1-P[K], and the index 330 points to P6 in local prediction table 320.

In one example, prediction 360 includes prediction address 365 and confidence 370. In one example, the predicted address has the same format as the access history, having page index 375 and page offset 380. In one example, prediction 360 includes confidence 370. Confidence 370 ranks the strength of prediction 360. In one example, the higher the value of confidence 370, the stronger the prediction. The strength of prediction 360 indicates whether the host CPU requested the cached data associated with the prediction. For example, prediction 360 in FIG. 3B has a page index of I20, a page offset of O14, and confidence of C10.

In one example, prediction engine 305 generates prefetching request 340 if the confidence of its prediction 360 is larger than a predefined value. If a prediction has confidence lower than the predefined value, prediction engine 305 replaces that prediction with a new prediction. In one example, a confidence value of zero indicates an unreliable prediction, and prediction engine 305 would ignore a prediction with zero confidence and replace it with another prediction.

In one example, to make a prediction from the current request, prediction engine 305 takes a set of previous access histories along with the current access history 335 and generates a hash from them. In one example, the configuration module of prediction engine 305 (e.g., configuration 235 in FIG. 2A) determines the number of access histories used by the hash. The hash generates an index 330 into local prediction table 320. In one example, local prediction table 320 has a cache structure, and the index 330 points to a valid prediction 360 in local prediction table 320 when index 330 matches a tag of an entry in the local prediction table 320. In one example, controller 385 receives the prediction and performs a lookup in the active page table based on the page index 375 of prediction 360 to find the page number. Controller 385 uses the page number and page offset 380 to generate an address to be prefetched. Prefetching request 340 carries the generated address to be prefetched.

In one example, a saturating counter of configurable size is used to indicate confidence 370 of prediction 360. In one example, the configuration module (e.g., configuration 235 in FIG. 2A) of prediction engine 305 determines the side of the counter. In one example, prediction engine 305 uses a 3-bit saturating counter to indicate confidence 370 of prediction 360. As a result, a value of 7 would indicate the maximum confidence in the prediction, and a value of 0 would indicate that the prediction is not useful and can be replaced with a more relevant prediction. The saturating counter could use a different number of bits in different implementations, such as 2 bits, 4 bits, or some other number of bits. In one example, prediction engine 305 increments the confidence counter when the prediction engine makes a prefetch prediction which is subsequently hit in the volatile memory cache. In one example, prediction engine 305 decrements the confidence counter when the prefetched data associated with the counter gets evicted from the volatile memory cache. In one example, prediction engine 305 decrements the confidence counter only when the prefetched data associated with the counter gets evicted from the volatile memory cache without generating a hit.

In one example, the prediction associated with that confidence is deemed unreliable and useless when the confidence value is less than a predefined value. In one example, when index 330 points to a prediction deemed useless, prediction engine 305 causes the volatile memory to evict the data associated with that prediction. In one example, prediction engine 305 causes to evict the useless prediction from the local prediction table and replaces the useless prediction with a new prediction.

Figure 4A:
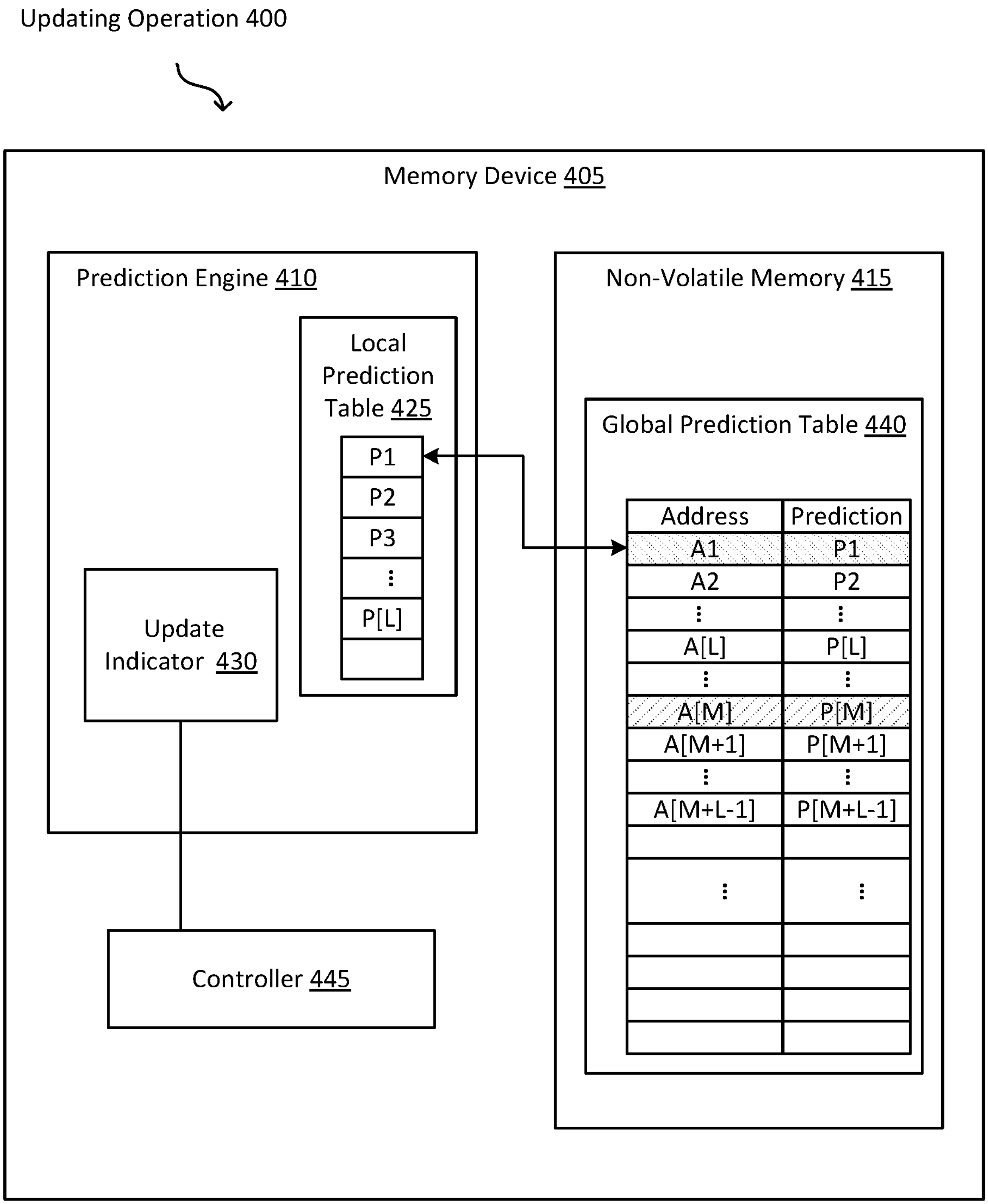
FIG. 4A is a block diagram of an example of an updating operation of the global prediction table.

FIG. 4A is a block diagram of an example of updating operation 400 of global prediction table 440. In one example, a smaller subset of global prediction table 440 is stored locally in local prediction table 425. In one example, local history table 425 contains information relevant to the currently running processes and applications on the system. To have relevant information at local history table 425, memory device 405 performs updating operations 400 and 480. During updating operation 400, memory device 405 transfers the content of local prediction table 425 to global prediction table 440.

In the example shown in FIG. 4A, predictions P1-P[L] are stored in addresses A1-A[L] in global prediction table 440. Predictions P1-P[L] are loaded into local prediction table 425. During the runtime of related processes, prediction engine 410 modifies and updates local prediction table 425. For example, prediction engine 410 may increment or decrement the confidence value of some of the predictions. In another example, prediction engine 410 may evict useless predictions and replace them with new predictions.

In one example, memory device 405 includes update indicator 430 implemented in hardware circuitry. In another example, update indicator 430 is implemented in the software. In one example, update indicator 430 is implemented in a combination of hardware and software. In one example, update indicator 430 initiates the transfer of data from local prediction table 425 to global prediction table 440. In one example, update indicator 430 causes controller 445 to transfer predictions from local prediction table 425 to global prediction table 440. After update indicator 430 initiates updating operation 400, predictions stored in local prediction table 425 are transferred to global prediction table 440. In example shown in FIG. 4A, controller 445 writes prediction P1-P[L] in address A1-A[L] in global prediction table 440.

In one example, controller 445 keeps the association between local prediction table 425 and global prediction table 440. In one example, controller 445 stores the address of global prediction table 440, to which controller 445 should transfer predictions in local prediction table 425.

In one example, update indicator 430 includes a counter that counts the number of access requests to the non-volatile memory 415. In one example, once the counter has a value greater than a predefined value, update indicator 430 initiates updating operation 400 and resets the counter. In one example, the counter is a saturating counter, and once the counter is saturated, update indicator 430 triggers updating operation 400 and resets the counter. In one example, the counter counts the number of new entries added to the active page table, e.g., active page table 210 in FIG. 2A. In one example, the host OS triggers update indicator 430. The host OS triggers update indicator 430 when the host executes a new program.

Figure 4B:
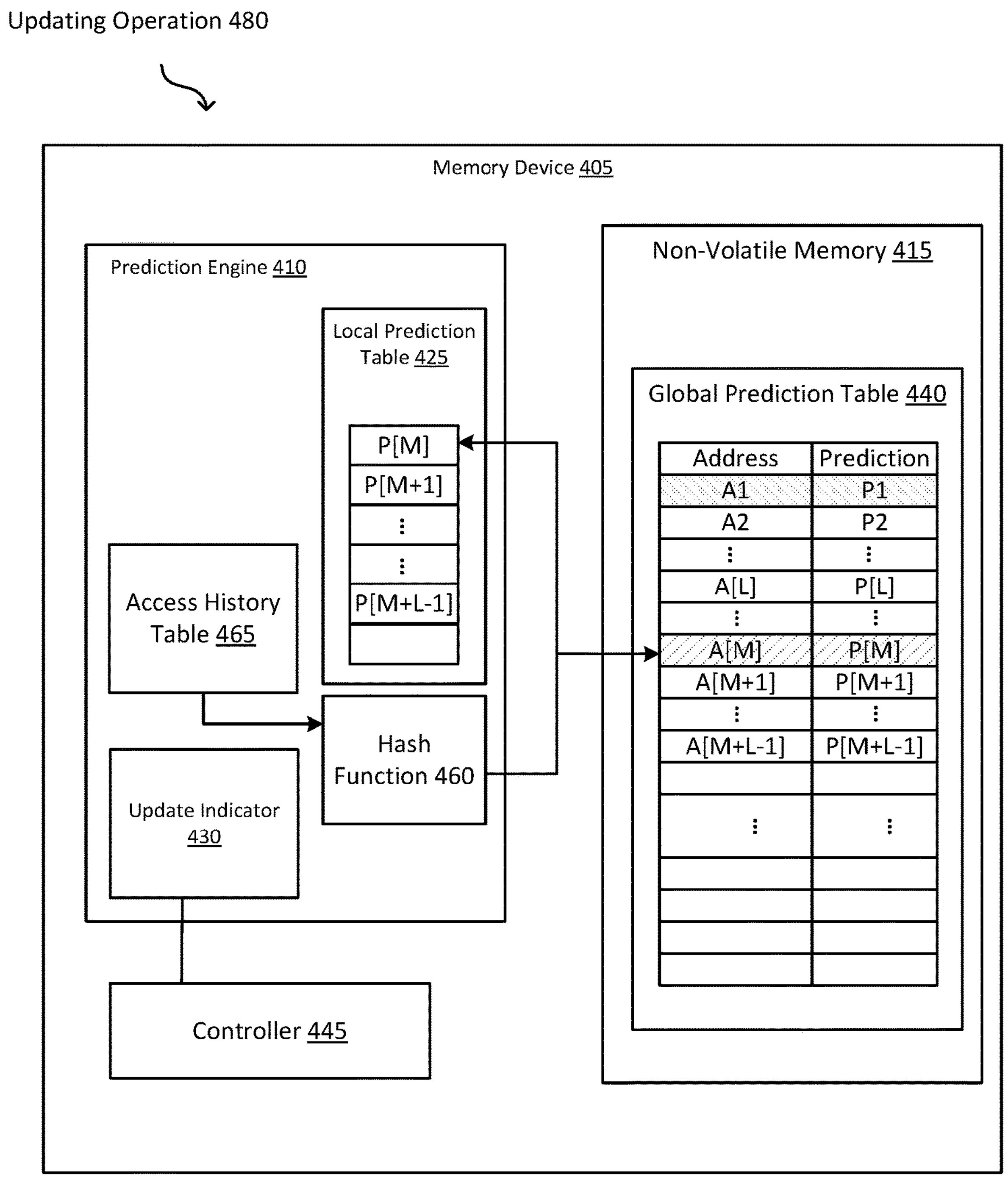
FIG. 4B is a block diagram of an example of an updating operation of the local prediction table.

FIG. 4B is a block diagram of an example of updating operation 480 of local prediction table 425. During updating operation 480, memory device 405 transfers the content of global prediction table 440 to local prediction table 425. Global prediction table 440 stores a large number of predictions in the non-volatile memory 415. In one example, the storage capacity of non-volatile memory 415 allocated to global prediction table 440 is greater than the memory capacity allocated to store local prediction table 425. Memory device 405 determines a subset of global prediction table 440 in non-volatile memory 415 and transfers it to and stores it at local prediction table 425. For example, in FIG. 4B, memory device 405 determines predictions P[M]-P[M+L−1], a total of L predictions, stored in addresses A[M]-A[M+L−1], and transfers them to local prediction table 425.

In one example, the number of predictions transferred from global prediction table 440 is equal to the storage capacity of local prediction table 425. In one example, the number of predictions transferred from global prediction table 440 is less than the storage capacity of local prediction table 425. In one example, the size of the local prediction table 425 and global prediction table 440 are configurable.

In one example, memory device 405 determines the subset of global prediction table 440 based on the processes and programs that the host processor and host OS are executing. In one example, memory device 405 determines the subset of global prediction table 440 based on the command and address signal sent by the host device. In one example, controller 445 of memory device 405 determines the subset of global prediction table 440 based on entries of the address request table, access history table, or active page table. In one example, hash function 460 determines the subset of global prediction table 440 to be transferred to local prediction table 425 based on the entries of access history table 465. For example, in FIG. 4B, hash function 460 receives entries of access history table 465 and determines predictions P[M]-P[M+L−1] stored in global prediction table 440 at addresses A[M]-A[M+L−1] to be transferred to local prediction table 425. In one example, controller 445 transfers and stores P[M]-P[M+L−1] in local prediction table 425.

In one example, memory device 405 keeps an association between the transferred data in local prediction table 425 and the source data in global prediction table 440. In one example, prediction engine 410 stores the association in a register. In one example, controller 445 tracks and stores the association.

Figure 5:
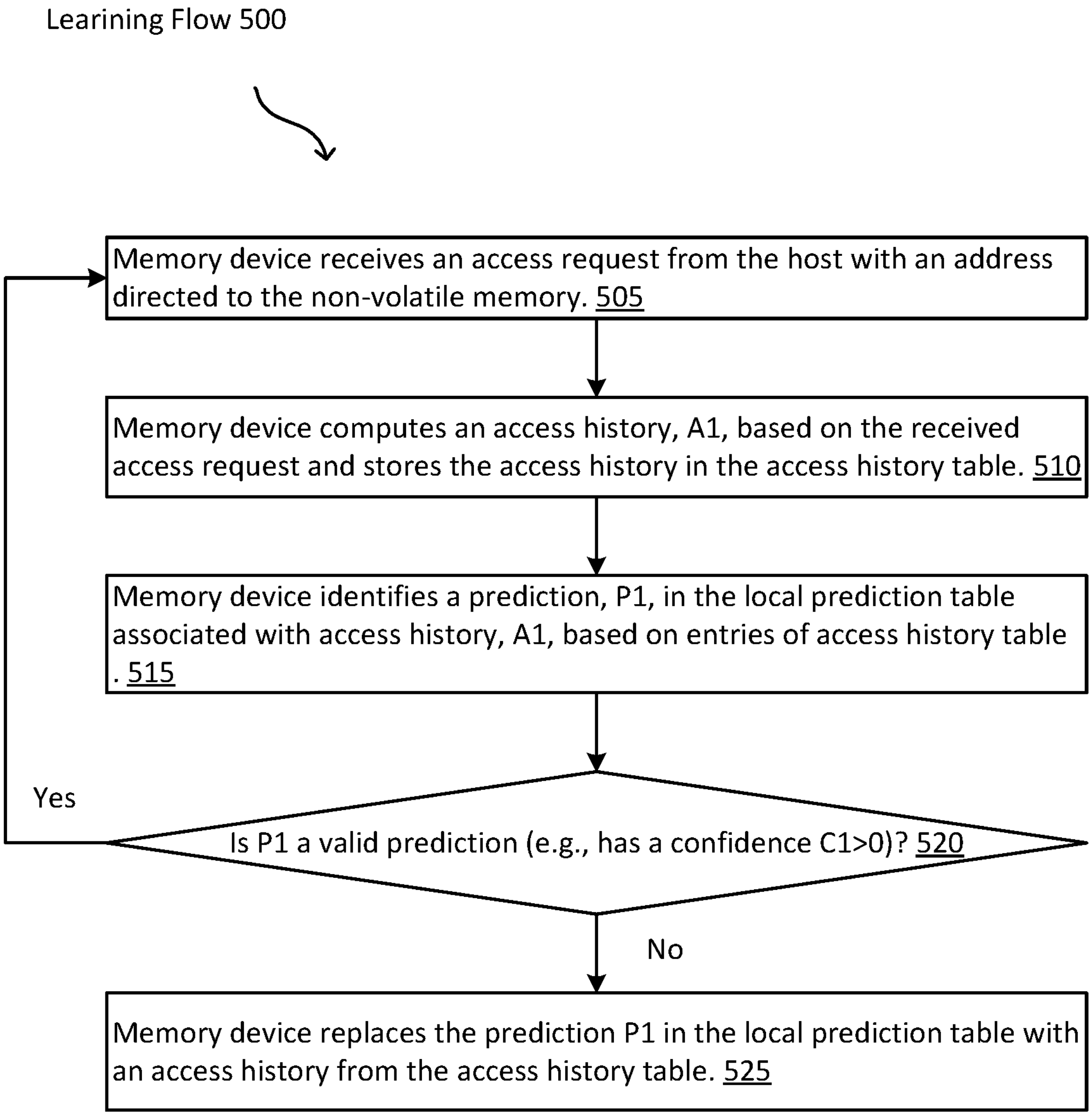
FIG. 5 is a flow diagram of an example of a learning flow process for a system implementing persistent predictive prefetching.

FIG. 5 is a flow diagram of an example of learning flow 500 for a system implementing persistent predictive prefetching. The process starts, as described in box 505 when the memory device receives an access request from the host. For example, a read request to read the data stored in the non-volatile memory. The access request includes an address that determines the location of the data in the non-volatile memory.

As described in box 510, the memory device computes an access history, A1, based on the received access request and stores the access history in the access history table. In one example, generating access history from the access request includes replacing the page number of the access request with a page index to make the process and prediction independent of the host OS resource allocation.

As described in box 515, the memory device identifies a prediction, P1, in the local prediction table associated with access history, A1, based on entries of the access history table. In one example, the memory device uses the entries of the access history table to compute a hash function. The hash function's output is an address directed to the local prediction table. In one example, the memory device makes an association between prediction P1 and access history A1.

As described in box 520, the memory device checks if the prediction P1 is a valid prediction. In one example, a valid prediction has a confidence value greater than value 0. In another example, a valid prediction has a confidence value great than a predefined value. In one example, if the prediction P1 is a valid prediction, learning flow 500 does not modify the prediction and starts over when it receives a new access request from the host.

Following the 'no' branch, i.e., when the prediction P1 is not a valid prediction (also referred to as bad prediction or useless prediction), the process arrives at the step described in box 525. As described in box 525, the memory device replaces the prediction P1 in the local prediction table with an access history from the access history table. In one example, the memory device expects the host to request the data associated with a prediction within a predefined time, where the data associated with a prediction is the data in the non-volatile memory in an address provided by the prediction. In one example, the memory device expects the host to request the data associated with a prediction within N access requests after making the prediction, where N is a predefined number.

In one example, the memory device counts the number of access histories added to the access history table following an access history associated with an invalid prediction. For example, the memory device counts the number of access histories added to the access history table following A1 associated with the invalid prediction P1. The memory device replaces the invalid prediction P1 by replacing the predicted address of the prediction P1 with the Nth access history following A1 and resets the confidence value of P1.

In another example, the memory device tracks A1 as it moves through the access history table. Each time a new access history is pushed on the top of the table, A1 is shifted one step towards the bottom of the table. Once A1 reaches the middle of the access history table, the memory device replaces the invalid prediction P1 by replacing the predicted address of the prediction P1 with the latest access history added to the access history table and rests the confidence value of P1. In one example, the memory device replaces the predicted address of P1 with the next access history that is added to the access history table.

Figure 6:
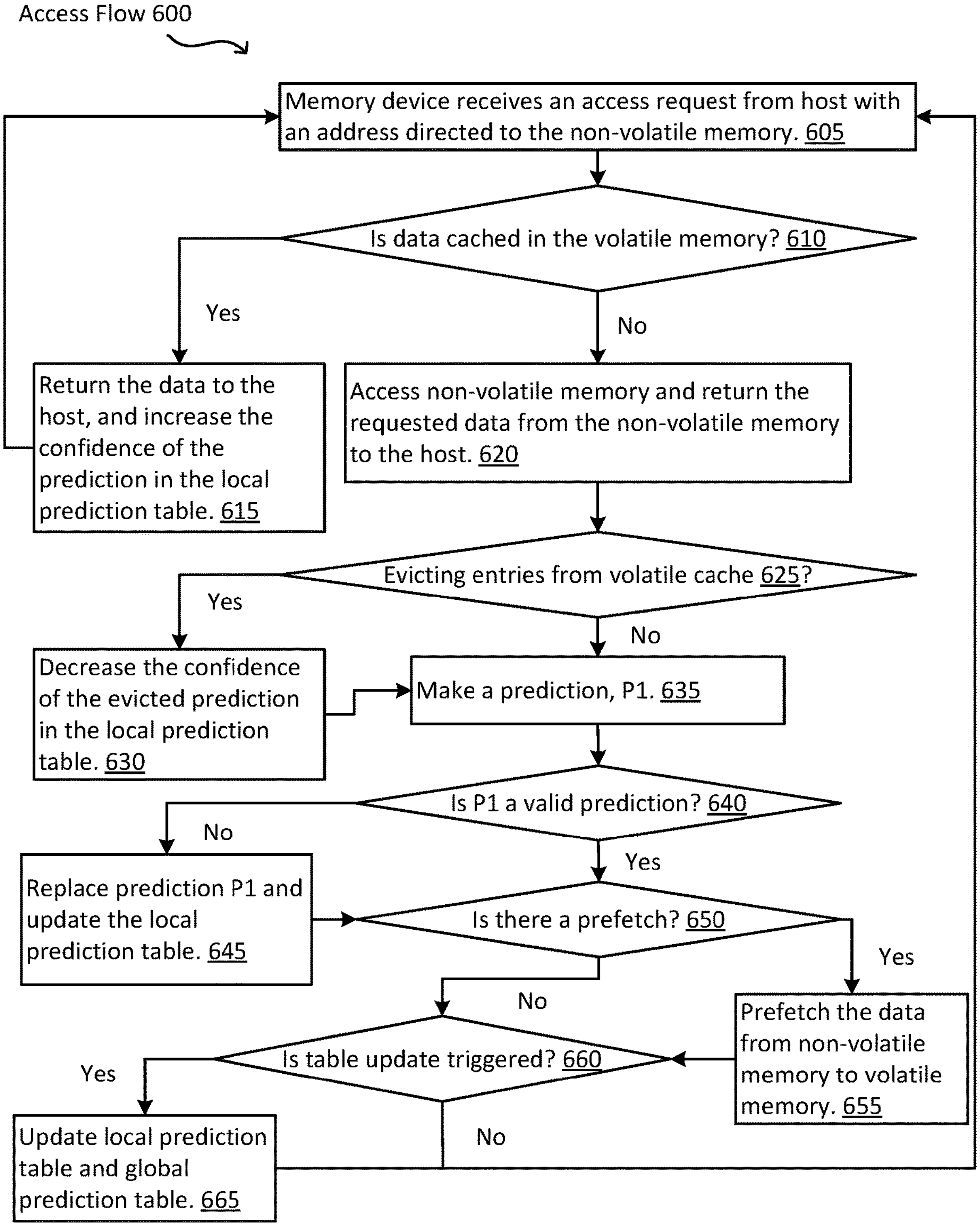
FIG. 6 is a flow diagram of an example of an access flow process for a system implementing persistent predictive prefetching.

FIG. 6 is a flow diagram of an example of access flow 600 for a system implementing persistent predictive prefetching. As described in box 605, access flow 600 starts with the memory device receiving an access request from the host. The access request includes an address directed to the non-volatile memory.

The memory device includes a volatile memory that operates as a cache. As described in box 610, the memory device checks the volatile memory to find whether the data requested by the host is cached in the volatile memory. Following the 'yes' branch, box 615 describes that the memory device returns the cached data to the host. The memory device also increases the confidence value of the prediction associated with the returned data, where the prediction is stored in the local prediction table. Access flow 600 repeats when a new access request arrives at the memory device. Following the 'no' branch from box 610, we arrive at box 620. As described in box 620, the non-volatile memory returns the requested data to the host. The process continues the steps described in box 625.

As described in box 625, the memory device implements the cache policy and checks whether an entry should be evicted from the volatile cache memory. If there is no cache eviction, following the 'no' branch, the memory device makes a prediction, P1, as described in box 635.

Following the 'yes' branch from box 625, as described in box 630, the memory device decreases the confidence of the prediction associated with the evicted data, where the prediction is stored in the local prediction table. Then, as described in box 635, the memory device makes a prediction P1.

As described in box 640, the memory device checks whether the prediction P1 is a valid prediction. If P1 is not a valid prediction, following the 'no' branch described in box 645, the memory device replaces the prediction P1 and updates the local prediction table. The flow proceeds to the steps described in box 650. Also, following the 'yes' branch from box 640, the process proceeds to the steps described in box 650.

As described in box 650, the memory device checks whether the data associated with the prediction P1 or its replacement needs to be prefetch, i.e., cached in the volatile memory. Following the 'yes' branch, as described in box 655, the memory device prefetches the data from non-volatile to volatile memory. The process then proceeds to the steps described in box 660. Following the 'no' branch from box 650, the process proceeds to perform the steps described in box 660.

As described in box 660, the memory device checks whether the table update is triggered. Following the 'yes' branch, the flow performs the steps described in box 665. As described in box 665, access flow 600 performs the updating operation similar to updating operations 400 and 480 in FIGS. 4A and 4B. The memory device determines a subset of the global prediction table, S1, in the non-volatile memory associated with the local prediction table. The memory device updates S1 with the local prediction table by replacing S1 with the entries of the local prediction table. The memory device determines another subset of the global prediction table, S2. The memory device updates the local prediction table by replacing the local prediction table with the content of S2. Access flow 600 repeats when a new access request arrives at the memory device. Similarly, following the 'no' branch of box 660, access flow 600 repeats when a new access request arrives at the memory device.

Figure 7:
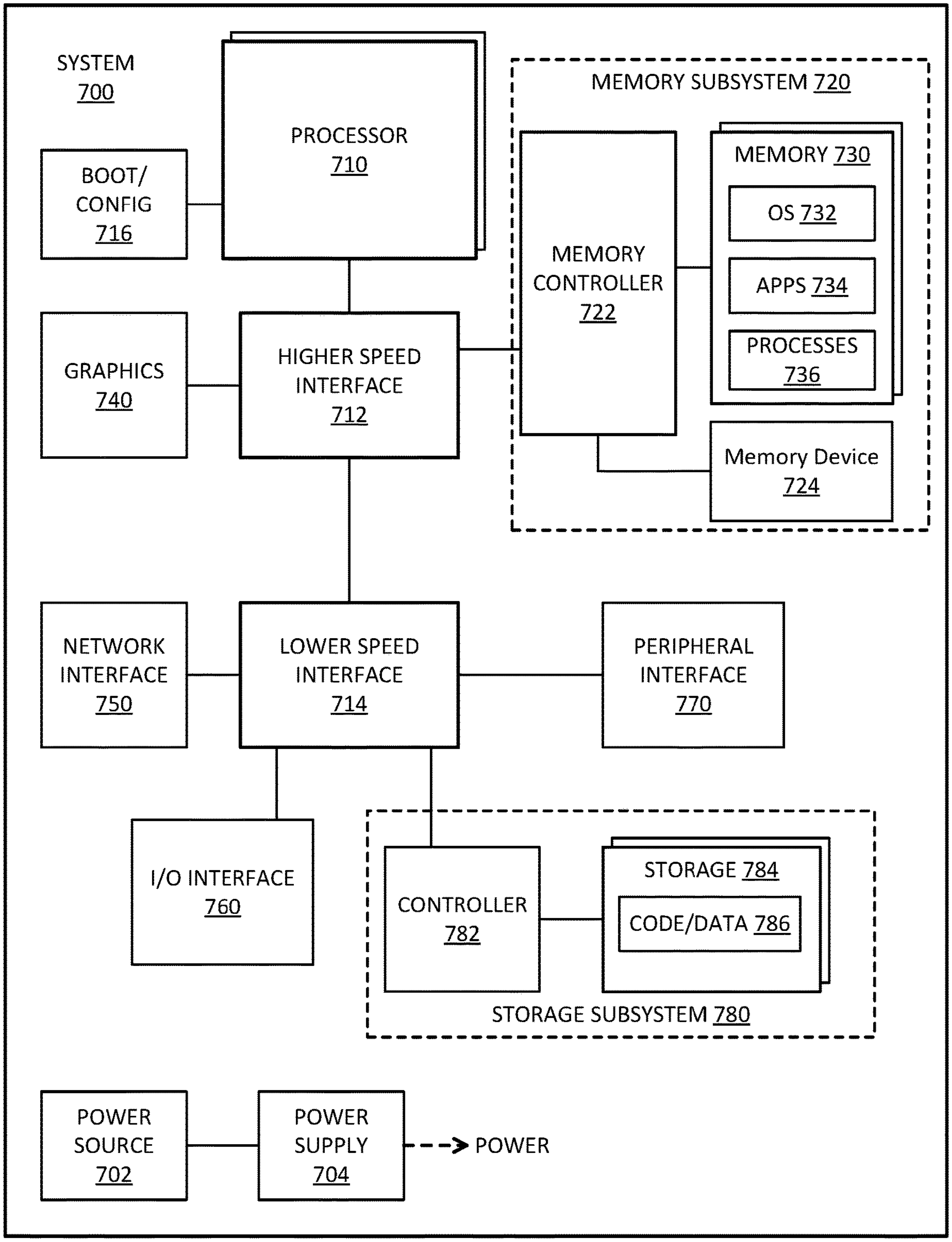
FIG. 7 is a block diagram of an example of a computing system that can include a memory device with persistent predictive prefetching.

FIG. 7 is a block diagram of an example of a computing system that can include a memory device with persistent predictive prefetching. System 700 represents a computing device in accordance with any example herein and can be a laptop computer, a desktop computer, a tablet computer, a server, a gaming or entertainment control system, an embedded computing device, or other electronic devices.

In one example, system 700 includes memory device 724 with persistent predictive prefetching. In one example, memory device 724 includes a non-volatile memory, a volatile memory to cache the data from non-volatile memory, and a prediction engine to predict and prefetch the data in volatile memory.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700 and can be or include one or more programmable general-purpose or special-purpose microprocessors, digital signal processors (DSPs), programmable controllers, application-specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system-level hardware that operates outside of a host OS (operating system). Boot/config 716 can include a non-volatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high-definition (HD) display or ultra-high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700 and provides storage for code to be executed by processor 710 or data values to be used in executing a routine. Memory subsystem 720 can include one or more varieties of random-access memory (RAM), such as DRAM, 3DXP (three-dimensional crosspoint), or other memory devices, or a combination of such devices. Memory 730 stores and hosts, among other things, operating system (OS) 732 to provide a software platform for executing instructions in system 700. Additionally, applications 734 can execute on the software platform of OS 732 from memory 730. Applications 734 represent programs with their own operational logic to execute one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not explicitly illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other buses, or a combination.

In one example, system 700 includes interface 714, which can be coupled to interface 712. Interface 714 can be a lower-speed interface than interface 712. In one example, interface 714 represents an interface circuit, which can include standalone components and integrated circuitry. In one example, multiple user interface components, peripheral components, or both are coupled to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacings). Peripheral interface 770 can include any hardware interface not specifically mentioned above. Peripherals refer generally to devices that connect dependently to system 700. A dependent connection is one where system 700 provides the software platform or hardware platform or both on which operation executes and with which a user interacts.

In one example, system 700 includes storage subsystem 780 to store data in a non-volatile manner. In one example, in certain system implementations, at least certain components of storage 780 can overlap with components of memory subsystem 720. Storage subsystem 780 includes storage device(s) 784, which can be or include any conventional medium for storing large amounts of data in a non-volatile manner, such as one or more magnetic, solid state, NAND, 3DXP, or optical-based disks or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is non-volatile, memory 730 can include volatile memory (i.e., the value or state of the data is indeterminate if power is interrupted to system 700). In one example, storage subsystem 780 includes controller 782 to interface with storage 784. In one example, controller 782 is a physical part of interface 714 or processor 710 or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

The following are examples in accordance with the descriptions herein.

Example 1: a memory device including: a non-volatile memory to store data; a volatile memory to cache the data from the non-volatile memory; and circuitry to: receive an access request, the access request including an address directed to the non-volatile memory, store an access history, the access history computed based on the access request, compute a prediction of a region of the non-volatile memory to be accessed based on the stored access history, cause to store the data from the predicted region of the non-volatile memory in the volatile memory, and store the prediction in the non-volatile memory.

Example 2: the memory device of example 1, wherein: the circuitry comprises a memory to store the access history in an access history table, the access request in an access request table, and the prediction in a local prediction table; the non-volatile memory comprises a global prediction table to store the prediction; the access request includes a page number and an offset to identify a location in the non-volatile memory; and the access history includes a page index and the offset, page index computed based on the page number.

Example 3: the memory device of examples 1 or 2, wherein the non-volatile memory allocated to store the global prediction table has a greater storage capacity than the memory allocated to store the local prediction table.

Example 4: the memory device of any of examples 1-3, wherein the computed prediction includes a confidence value to rank the strength of the prediction.

Example 5: the memory device of any of examples 1-4, wherein the circuitry is to increase the confidence value when the data associated with the computed prediction is accessed in the volatile memory.

Example 6: the memory device of any of examples 1-5, wherein the circuitry is to decrease the confidence value when the data associated with the computed prediction is evicted from the volatile memory.

Example 7: the memory device of any of examples 1-6, wherein the circuitry to cause the memory to replace the prediction having the confidence value lower than a predefined value with an other prediction.

Example 8: the memory device of any of examples 1-7, wherein the memory is a portion of the volatile memory.

Example 9: the memory device of any of examples 1-8, wherein the circuitry to: determine a first subset of a global prediction table in the non-volatile memory, wherein the global prediction table is to include the stored prediction in the non-volatile memory; and store the first subset of the global prediction table in a local prediction table.

Example 10: the memory device of any of examples 1-9, wherein the circuitry to: determine a second subset of the global prediction table in the non-volatile memory; store updates to the first subset of the global prediction table based on changes made to the local prediction table; and subsequently replace the local prediction table with the second subset of the global prediction table.

Example 11: a computer system including: a processor; and a memory device including: a non-volatile memory to store data; a volatile memory to cache the data from the non-volatile memory; and circuitry to: receive an access request, the access request including an address directed to the non-volatile memory, store an access history, the access history computed based on the access request, compute a prediction of a region of the non-volatile memory to be accessed based on the stored access history, cause to store the data from the predicted region of the non-volatile memory in the volatile memory, and store the prediction.

Example 12: the computer system of example 11, wherein the circuitry comprises a memory to store the access history in an access history table, the access request in an access request table, and the prediction in a local prediction table; the non-volatile memory comprises a global prediction table to store the prediction; the access request includes a page number and an offset to identify a location in the non-volatile memory; and the access history includes a page index and the offset, page index computed based on the page number.

Example 13: the computer system of examples 11 or 12, wherein the computed prediction includes a confidence value to rank the strength of the prediction; the circuitry is to increase the confidence value when the data associated with the computed prediction is accessed in the volatile memory; the circuitry is to decrease the confidence value when the data associated with the computed prediction is evicted from the volatile memory; and the circuitry to cause the memory to replace the prediction having the confidence value lower than a predefined value with an other prediction.

Example 14: the computer system of any of examples 11-13, wherein the circuitry to: determine a first subset of the global prediction table in the non-volatile memory; and store the first subset of the global prediction table in a local prediction table in the second memory.

Example 15: the computer system of any of examples 11-14, wherein the circuitry to: determine a second subset of the global prediction table in the non-volatile memory; update the first subset of the global prediction table with the local prediction table; and replace the local prediction table with the second subset of the global prediction table.

Example 16: a method including: receiving an access request; computing an access history based on the access request; storing the access history; computing a prediction of a region of a non-volatile memory to be accessed based on the stored access history; causing to store the data from the predicted region of the non-volatile memory in a volatile memory; and storing the prediction.

Example 17: the method of example 16, wherein the computed prediction includes a confidence value to rank the strength of the prediction.

Example 18: the method of any of examples 16 or 17 including: increasing the confidence value when the data associated with the computed prediction is accessed in the volatile memory.

Example 19: the method of any of examples 16-18, comprising decreasing the confidence value when the data associated with the computed prediction is evicted from the volatile memory.

Example 20: the method of any of examples 16-19 including: determining a first subset of a global prediction table in the non-volatile memory, wherein the global prediction table is to include the stored prediction in the non-volatile memory; storing the first subset of the global prediction table in a local prediction table; determining a second subset of the global prediction table in the non-volatile memory; storing updates to the first subset of the global prediction table based on changes made to the local prediction table; and subsequently replacing the local prediction table with the second subset of the global prediction table.

Flow diagrams, as illustrated herein, provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, the order of the actions can be modified unless otherwise specified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon or via a method of operating a communication interface to send data via the communication interface. A machine-readable storage medium can cause a machine to perform the functions or operations described and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application-specific hardware, application-specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative and not a restrictive sense. The scope of the invention should be measured solely by reference to the claims that follow.

What is claimed is:

1. A memory device comprising:
a non-volatile memory to store data;
a volatile memory to cache the data from the non-volatile memory; and
circuitry to:
receive an access request, the access request including an address directed to the non-volatile memory,
store an access history, the access history computed based on the access request,
compute a prediction of a region of the non-volatile memory to be accessed based on the stored access history,
cause to store the data from the predicted region of the non-volatile memory in the volatile memory,
store the prediction in the non-volatile memory,
determine a first subset of a global prediction table in the non-volatile memory, wherein the global prediction table is to include the stored prediction in the non-volatile memory, and
store the first subset of the global prediction table in a local prediction table.

2. The memory device of claim 1, wherein:
the circuitry comprises a memory to store the access history in an access history table, the access request in an access request table, and the prediction in a local prediction table;
the non-volatile memory comprises a global prediction table to store the prediction;
the access request includes a page number and an offset to identify a location in the non-volatile memory; and
the access history includes a page index and the offset, page index computed based on the page number.

3. The memory device of claim 2, wherein the non-volatile memory allocated to store the global prediction table has a greater storage capacity than the memory allocated to store the local prediction table.

4. The memory device of claim 2, wherein the computed prediction includes a confidence value to rank the strength of the prediction.

5. The memory device of claim 4, wherein the circuitry is to increase the confidence value when the data associated with the computed prediction is accessed in the volatile memory.

6. The memory device of claim 4, wherein the circuitry is to decrease the confidence value when the data associated with the computed prediction is evicted from the volatile memory.

7. The memory device of claim 4, wherein the circuitry to cause the memory to replace the prediction having the confidence value lower than a predefined value with an other prediction.

8. The memory device of claim 2, wherein the memory is a portion of the volatile memory.

9. The memory device of claim 1, wherein the circuitry to:
determine a second subset of the global prediction table in the non-volatile memory;
store updates to the first subset of the global prediction table based on changes made to the local prediction table; and
subsequently replace the local prediction table with the second subset of the global prediction table.

10. A computer system comprising:
a processor; and
a memory device including:
a non-volatile memory to store data;
a volatile memory to cache the data from the non-volatile memory; and
circuitry to:
receive an access request, the access request including an address directed to the non-volatile memory,
store an access history, the access history computed based on the access request,
compute a prediction of a region of the non-volatile memory to be accessed based on the stored access history,
cause to store the data from the predicted region of the non-volatile memory in the volatile memory,
store the prediction, determine a first subset of a global prediction table in the non-volatile memory, and store the first subset of the global prediction table in a local prediction table in the volatile memory.

11. The computer system of claim 10, wherein the circuitry comprises a memory to store the access history in an access history table, the access request in an access request table, and the prediction in a local prediction table;

the non-volatile memory comprises a global prediction table to store the prediction;

the access request includes a page number and an offset to identify a location in the non-volatile memory; and the access history includes a page index and the offset, page index computed based on the page number.

12. The computer system of claim 11, wherein the computed prediction includes a confidence value to rank the strength of the prediction;

the circuitry is to increase the confidence value when the data associated with the computed prediction is accessed in the volatile memory;

the circuitry is to decrease the confidence value when the data associated with the computed prediction is evicted from the volatile memory; and the circuitry to cause the memory to replace the prediction having the confidence value lower than a predefined value with an other prediction.

13. The computer system of claim 10, wherein the circuitry to:

determine a second subset of the global prediction table in the non-volatile memory;

update the first subset of the global prediction table with the local prediction table; and replace the local prediction table with the second subset of the global prediction table.

14. A method comprising:

receiving an access request;

computing an access history based on the access request;

storing the access history;

computing a prediction of a region of a non-volatile memory to be accessed based on the stored access history;

causing to store data from the predicted region of the non-volatile memory in a volatile memory;

storing the prediction;

determining a first subset of a global prediction table in the non-volatile memory; and storing the first subset of the global prediction table in a local prediction table in the volatile memory.

15. The method of claim 14, wherein the computed prediction includes a confidence value to rank the strength of the prediction.

16. The method of claim 15, comprising increasing the confidence value when the data associated with the computed prediction is accessed in the volatile memory.

17. The method of claim 15, comprising decreasing the confidence value when the data associated with the computed prediction is evicted from the volatile memory.

18. The method of claim 14, comprising:

determining a first subset of a global prediction table in the non-volatile memory, wherein the global prediction table is to include the stored prediction in the non-volatile memory;

storing the first subset of the global prediction table in a local prediction table;

determining a second subset of the global prediction table in the non-volatile memory;

storing updates to the first subset of the global prediction table based on changes made to the local prediction table; and subsequently replacing the local prediction table with the second subset of the global prediction table.

* * * * *